United States Patent [19]

Michiguchi et al.

[11] Patent Number: 4,677,438
[45] Date of Patent: Jun. 30, 1987

[54] METHOD AND APPARATUS FOR DETECTING AN OBJECT OR A CONDITION INDICATING A DEFECT IN A MEDIUM

[75] Inventors: Yoshihiro Michiguchi, Ibaraki; Kazuo Hiramoto, Hitachi; Masatsugu Nishi; Fuminobu Takahashi, both of Katsuta, all of Japan

[73] Assignee: Hitachi, Ltd., Tokyo, Japan

[21] Appl. No.: 792,887

[22] Filed: Oct. 30, 1985

[30] Foreign Application Priority Data

Oct. 31, 1984 [JP] Japan .............................. 59-227766

[51] Int. Cl.$^4$ .............................................. G01V 3/12
[52] U.S. Cl. ...................................... 342/22; 324/337
[58] Field of Search ............ 343/5 NA; 324/337, 323, 324/326-329, 332, 334, 344; 455/40; 342/22; 73/627-631

[56] References Cited

U.S. PATENT DOCUMENTS 4,245,191 1/1981 Schroeder .................... 343/5 NA X
4,583,095 4/1986 Peterson ........................ 343/5 NA

OTHER PUBLICATIONS

Arai et al., "An Underground Radar System"; Trans. of the Institute of Electronics and Communications Engineering; (6/83, vol. J66-B, No. 6; pp. 713-719).

Suzuki et al.; "Underground Radar System"; *Sane;* (vol. 79, No. 220, 1/25/80; pp. 21-28).

*Primary Examiner*—T. H. Tubbesing
*Assistant Examiner*—Bernarr E. Gregory
*Attorney, Agent, or Firm*—Antonelli, Terry & Wands

[57] ABSTRACT

An object detecting method and apparatus is disclosed and which operates by transmitting a wave toward an object embedded in a medium having a reflective coefficient at its surface, receiving the resultant reflected wave from the object, applying the received signal to a signal processing unit, and displaying the results of signal processing by the signal processing unit on a display unit. The apparatus and method, furthermore, incorporates the means or steps of multiplying the received signal by a reference signal corresponding to the high frequency wave of the radiation energy and with its phase shifted by a controlled amount, so that the frequency of a signal component included in the received signal as a result of wave reflection from the surface of the medium is converted into a frequency which can be removed by a low-pass filter, passing the resultant received signal through the low-pass filter, and applying the output signal of the low-pass filter to the signal processing unit for processing a clear and sharp image reproduction of the object on a display.

12 Claims, 26 Drawing Figures

LOCATION OF OBJECT

IMAGE MEMORY CONTENTS
= DISPLAYED IMAGE

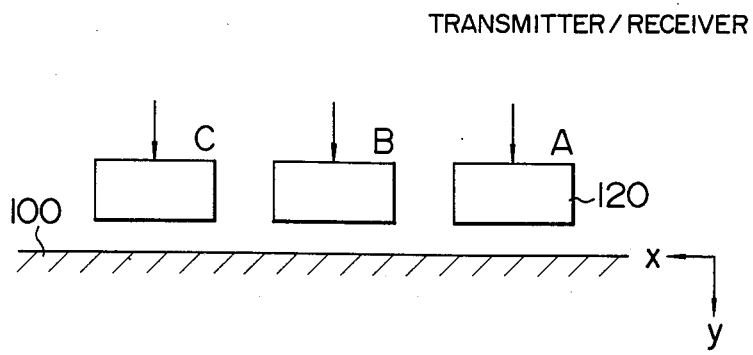
FIG. 10A
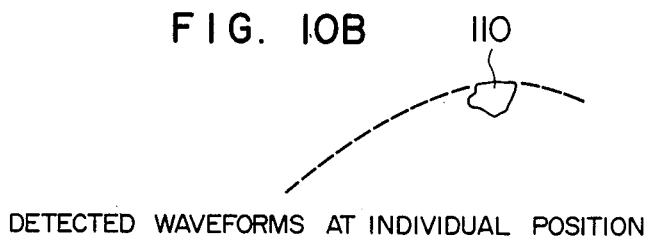
FIG. 10B
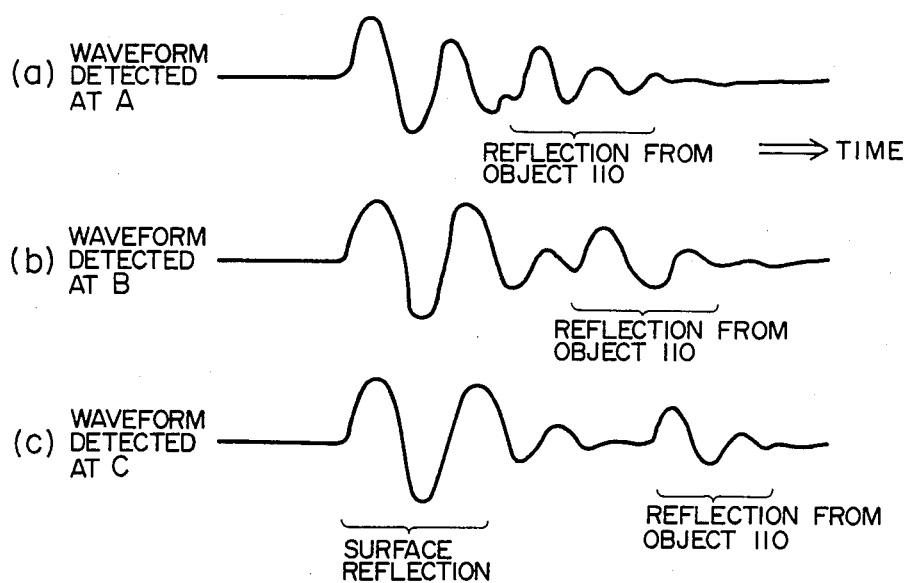

F I G. 16
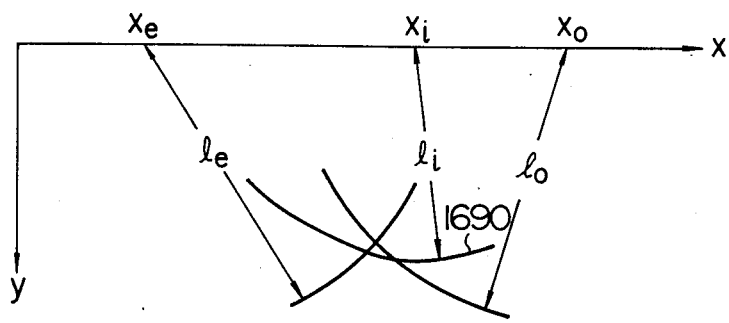
F I G. 17
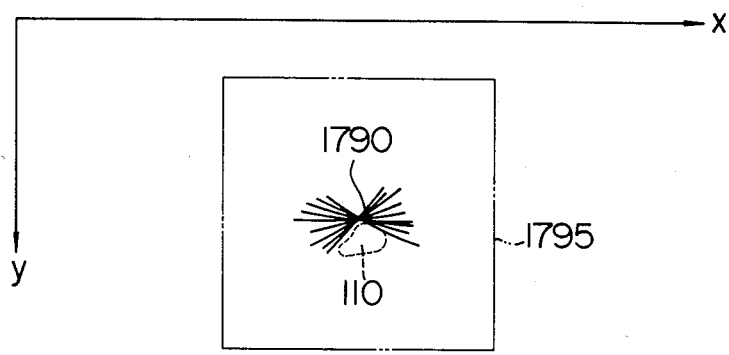
F I G. 21
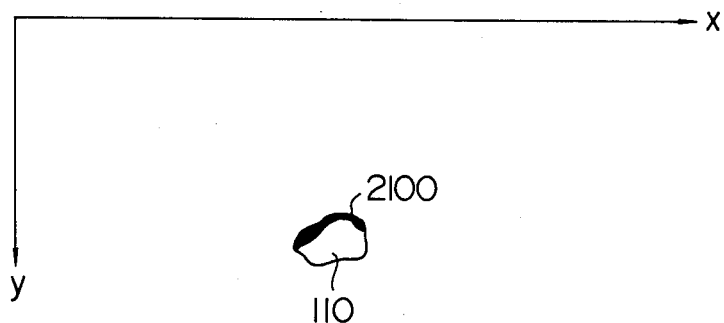

METHOD AND APPARATUS FOR DETECTING AN OBJECT OR A CONDITION INDICATING A DEFECT IN A MEDIUM

BACKGROUND OF THE INVENTION

This invention relates to a method and apparatus for detecting an object.

A prior art method for detecting an object comprises radiating or transmitting a radio wave or sound wave to find the presence or absence of an object, detecting an echo of the radio wave or sound wave reflected from the object when the object is present, and determining the position of the object on the basis of the length of time elapsed from the time of transmission of the wave to the time of detection of the echo or reflected wave. Such a method has been used for detection of either an underground buried object or for detection of a defect in an object.

FIG. 4 shows the structure of a prior art apparatus for detecting an underground buried object by using a radio wave, as disclosed in "Underground radar system" by Ikuo Arai et al, Transactions of the Institute of Electronics and Communication Engineering (Japan), June 1983, Vol. J66-B, No. 6. Referring to FIG. 4, an oscillator 1 oscillates at a high frequency radiates a radio wave toward and into the ground from an antenna 6 through a transmission/reception selector 2 which is changed over to its transmission mode. The wave reflected from a buried object 7 beneath the ground surface 8 is received by the antenna 6, this time as a reflected signal, and is transmitted by the transmission/reception selector 2 while in its reception mode, and is applied through an amplifier 3 to a display unit 5. A control unit 4 computes the depth of the buried object 7 on the basis of the time difference between the time of wave transmission from the oscillator 1 and the time of reflected wave reception and, also, on the basis of the propagation velocity of the radio wave, and determines the point to be displayed on the display unit 5.

For the purpose of detection of the horizontal position of the buried object 7, the antenna 6, which radiates the radio wave and detects the reflected wave, is moved in the horizontal direction. The horizontal distribution of the intensity of the reflected wave and that of the length of time elapsed until detection of the reflected wave are computed to ascertain the horizontal position of the buried object 7 on the basis of the point where the reflected wave intensity is maximum and the reflected wave detection time is minimum.

Part of the radio wave radiated from the antenna 6 is reflected by the ground surface 8, and the remainder propagates into the ground. Part of the radio wave reflected from the ground surface 8 is reflected by the antenna 6, and such reflection between the ground surface 8 and the antenna 6 is repeated until the wave is sufficiently attenuated. The signal attributable to the wave reflection from the ground surface 8 is received until the radio wave is sufficiently attenuated after a period of time of 2h/v sec has elapsed from the time of wave radiation, where h is the distance between the antenna 6 and the ground surface 8 in meters and v is the wave propagation velocity in m/sec. Therefore, there has been such a possibility that the reflected wave from the ground surface 8 is mistaken as the reflected wave from the buried object 7 when judgment is based on only the length of time elapsed from the time of wave radiation to the time of reflected wave reception.

The reflectivity of the ground surface 8 for radio wave is approximately equal to or more than 0.3. On the other hand, the intensity of radio wave penetrating the ground surface 8 and propagating through the earth is greatly attenuated by the conductivity of the earth. When the depth of the buried object 7 from the ground surface 8 is about 1 to 2 meters, the intensity of reflected wave from the buried object 7 becomes lower than that of wave repeatedly reflected from the ground surface 8. The reflected wave from the buried object 7 and that from the ground surface 8 overlap each other in the received signal. Therefore, the prior art apparatus has had a possibility of misjudging the presence or absence, size and depth of the buried object 7.

In addition a so-called synthetic aperture processing method has been employed hitherto as a method of signal processing capable of detecting the position of an object with high accuracy. According to this method, the distance between the antenna 6 and a wave reflecting object is computed on the basis of the length of time elapsed from the time of radio wave radiation to the time of reflected wave reception, and the position of the reflecting object is determined on the basis of the change in the distance between the antenna 6 and the reflecting object due to the movement of the antenna 6. However, it is difficult to accurately determine the position of the buried object 7 when the reflected wave from the ground surface 8 cannot be separated from the reflected wave from the buried object 7 as described above. Further, according to the prior art, in the synthetic aperture processing method, the reflected signal from the buried object 7 cannot be recognized before the step of signal processing. Therefore, it has been necessary to apply the synthetic aperture processing to the time range in which the reflected wave from the ground surface 8 is received only or the time range wherein no reflected wave appears, resulting in an extended period of time required for processing.

The above problem involved in the prior art buried-object detecting apparatus is also encountered in a prior art ultrasonic defect detecting apparatus. FIG. 2, in which the same or like components are shown by the same reference numerals as FIG. 4, shows the structure of such a prior art ultrasonic defect detecting apparatus. Referring to FIG. 2, a pulse signal is applied from an oscillator 1 to a probe 9 moved in the horizontal direction by a driver 10, and ultrasonic wave transmitted from the probe 9 propagates through an object 11 to be tested. The reflected wave from a defect 12 such as a scar, if any, is received by the probe 9, and the position of the wave reflector such as the scar 12 is determined by a control unit 4 on the basis of the length of time elapsed from the time of wave radiation to the time of reflected wave reception. The property of the propagation medium changes at the portion adjacent to the end of the probe 9, and reflection of the ultrasonic wave results. This reflection of the ultrasonic wave corresponds to the reflection of the radio wave from the ground surface 8 in the case of the aforementioned buried-object detecting apparatus. Therefore, the ultrasonic wave repeatedly reflected inside the probe 9 overlaps the reflected wave from a defect 12 existing near the surface of the object 11, and it has been difficult to distinguish the latter wave from the former wave. A problem similar to that described already with reference to the buried-object detecting apparatus has also been encountered when the synthetic aperture processing method is applied to the ultrasonic defect detecting apparatus for signal processing.

SUMMARY OF THE INVENTION

With a view to solve the prior art problems pointed out above, it is a primary object of the present invention to provide a detecting method and apparatus which can detect an object with high accuracy by extracting, from a received signal in which reflected wave from the object is mixed with unnecessary reflected wave, the true wave signal reflected from the object.

In accordance with one aspect of the present invention, there is provided a detecting method including transmitting a wave toward an object present in a medium, receiving the resultant reflected wave from the object, applying the received signal to a signal processing unit, and displaying the results of signal processing by the signal processing unit on a display unit, the method comprising the steps of multiplying the received signal by a reference signal so that the frequency of a signal component included in the received signal as a result of wave reflection from the surface of the medium is converted into a frequency which can be removed by a low-pass filter, passing the multiplied signal through the low-pass filter, and applying the output signal of the low-pass filter to the signal processing unit.

In accordance with another aspect of the present invention, there is provided a detecting apparatus including transmission/reception means transmitting a wave toward an object present in a medium and receiving the resultant reflected wave from the object, a signal processing unit processing the received signal applied from the transmission/reception means, and a display unit displaying the results of signal processing by the signal processing unit, the apparatus comprising an oscillator generating a reference signal having the same frequency as that of the received signal, a phase shifter receiving the output signal of the oscillator as its input for shifting the phase of the output signal, a multiplier receiving the output signal of the phase shifter and the received signal as its inputs for multiplying the latter signal by the former signal, and a low-pass filter receiving the output signal of the multiplier as its input and applying its output signal to the signal processing unit.

BRIEF DESCRIPTION OF THE DRAWINGS

FIGS. 10A and 10B show various positions of the transmitter/receiver 120 relative to an object to be detected and corresponding reflected waveforms received by the receiver.

FIG. 16 shows schematically the manner of imaging according to the present invention.

FIG. 17 shows an example of the reproduced image.

FIG. 21 shows an example of the image thus reproduced.

DESCRIPTION OF THE PREFERRED EMBODIMENTS

Before describing preferred embodiments of the present invention in detail, the basic principle of the present invention will be described so that the present invention can be more clearly understood.

First, in the present invention, a received signal is multiplied by a separately prepared, reference wave signal. Suppose that the received signal and the reference wave signal are expressed respectively as A sin $(\omega t + \phi)$ and sin $(\omega t + \phi')$, where $\omega$ is the angular frequency, and $\phi$ and $\phi'$ are the phases. Then, the product of these two signals is expressed as follows:

$$\frac{A}{1} \{\cos(2\omega t + \phi + \phi') - \cos(\phi - \phi')\}$$

The above product represents a signal in which an AC component having an angular frequency of $2\omega$ is superposed on a DC component having a level of A/2 cos $(\phi - \phi')$. This signal is passed through a low-pass filter to extract the DC level of A/2 cos $(\phi - \phi')$.

Figure 2:
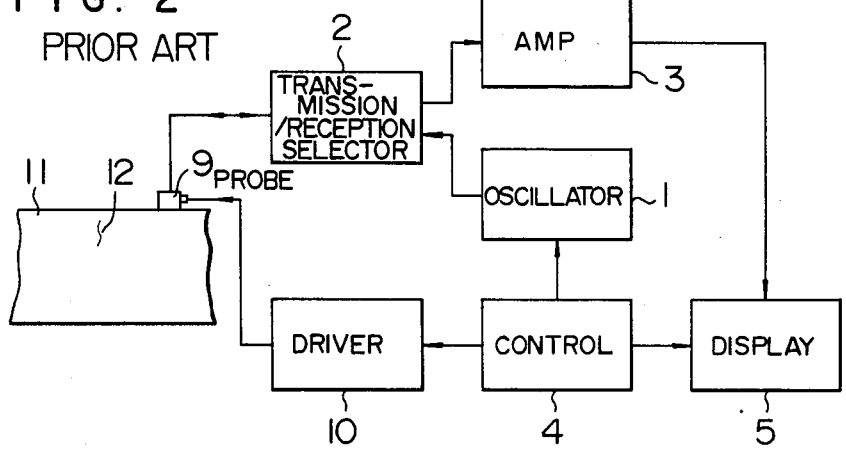
FIG. 2 is a block diagram showing the structure of a prior art, ultrasonic defect detecting apparatus.
Figure 4:
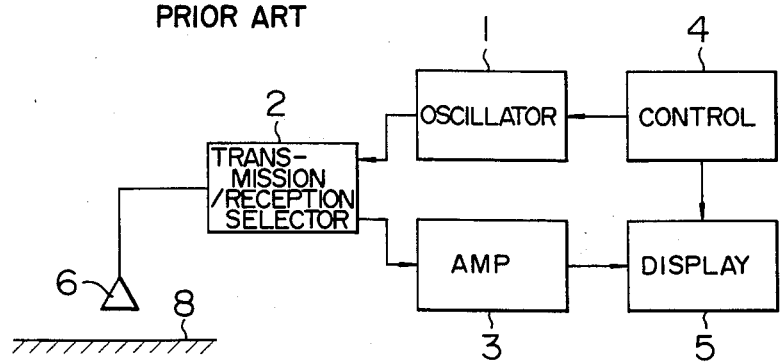
FIG. 4 is a block diagram showing the structure of a prior art, buried-object detecting apparatus.

In the case of the buried-object detecting apparatus shown in FIG. 4, a reflected wave from the ground surface 8 is first received after radiation of radio wave, and, also, in the case of the ultrasonic defect detecting apparatus shown in FIG. 2, reflected wave from the ground surface 8 is first received after radiation of ultrasonic wave. The phase $\phi$ of these unnecessary reflected waves does not change regardless of movement of the antenna 6 or the probe 9. Therefore, when the phase $\phi'$ of the reference wave is suitably selected to satisfy the relation $\phi - \phi' = \pi/2$, the output corresponding to the unnecessary reflected wave in each case can be reduced to zero at whatever position of the antenna 6 or the probe 9.

On the other hand, the phase $\phi$ of the reflected signal from the object 7 to be detected changes with the movement of the antenna 6 or the probe 9.

Figure 3:
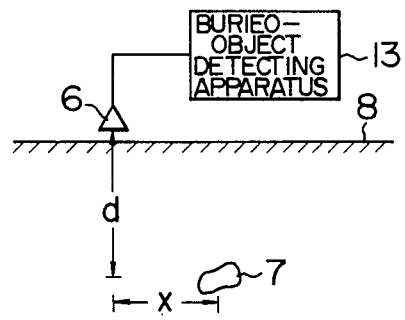
FIG. 3 shows the relation between the position of an antenna of a detecting apparatus relative to that of an object to be detected, to illustrate the basic principle of the present invention.

The change in the phase $\phi$ of the received signal will be described with reference to FIG. 3 in which a buried-object detecting apparatus 13 is shown by way of example. This phase $\phi$ is expressed as follows:

$$\phi = 4\pi \sqrt{x^2 + d^2} / \lambda \quad (1)$$

where d is the depth of a buried object 7, x is the horizontal distance between the buried object 7 and an antenna 6, and λ is the wavelength of radio wave used for object detection. The output of the low-pass filter is expressed as follows:

$$\frac{A}{2} \cos\{4\pi \sqrt{x^2 + d^2} / \lambda - \phi'\}$$

It will be seen that the DC output level changes with the change in the horizontal distance x. Therefore, when the change in the phase φ due to the change in the position of the antenna 6 or the change in the DC output of the low-pass filter is detected, the reflected wave signal from the buried object 7 can be distinguished.

The change rate of the phase φ and the change rate of the low-pass filter output P relative to the change in the horizontal distance x between the antenna 6 and the buried object 7 are expressed respectively as follows:

$$\frac{d\phi}{dx} = \frac{4\pi}{\lambda} \frac{x}{\sqrt{x^2 + d^2}} \quad (2)$$

$$\frac{dP}{dx} = -\frac{A}{2} \sin\{4\pi \sqrt{x^2 + d^2} / \lambda - \phi'\} \cdot \frac{4\pi}{\lambda} \frac{x}{\sqrt{x^2 + d^2}} \quad (3)$$

Either $$\frac{d\phi}{dx} \text{ or } \frac{dP}{dx}$$

may be detected. However, it will be seen from the expressions (2) and (3) that $$\frac{d\phi}{dx} = 0 \text{ and } \frac{dP}{dx} = 0$$

when x=0. The change rate of the phase φ of the reflected wave from the ground surface relative to the horizontal distance x is zero. Thus, a phase change can be distinguished, when a suitable threshold level of more than $$\left|\frac{d\phi}{dx}\right| = 0 \text{ and } \left|\frac{dP}{dx}\right| = 0$$

is selected for separation of the ground-surface reflected wave, and such a threshold level is exceeded.

By arranging in the manner described above, unnecessary waves reflected from the ground surface and elsewhere can be removed, and the wave reflected from the object such as the buried object can be accurately detected.

When the reflected wave signal from the object detected in the manner above described above is solely processed according to the synthetic processing aperture method, the position of the object can be detected with high accuracy and within a short time as compared to the case of synthetic aperture processing in the time range in which unnecessary reflected wave only appears or no reflected wave appears.

Preferred embodiments of the present invention will now be described in detail.

Figure 1:
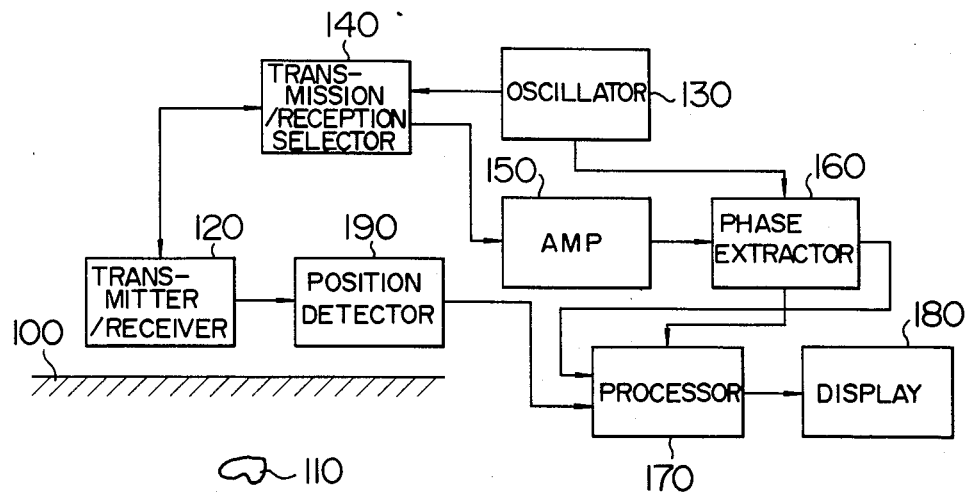
FIG. 1 is a block diagram showing the structure of an embodiment of the detecting apparatus according to the present invention.

FIG. 1 is a block diagram showing the basic structure of a preferred embodiment of the detecting apparatus according to the present invention. The reference numeral 100 designates a medium in which an object 110 to be detected is present. For example, in the case of ultrasonic defect detection, the medium 100 is a piping material or a pressure vessel material, and the object 110 is a defect existing in the material. Also, in the case of detection of an underwater object, the medium 100 is seawater or non-saline water, and the object 110 is, for example, a submarine. Further, when the object 110 is a gas supply pipe, a water supply pipe or the like, the medium 100 is asphalt or earth in which such a pipe is buried.

A transmitter/receiver 120 is provided for the purpose of detection of the object 110, and a signal from a pulse oscillator 130 is applied through a transmission/reception selector 140 to the transmitter/receiver 120. This transmitter/receiver 120 is an ultrasonic transmitter/receiver in the case of ultrasonic defect detection and is an antenna in the case of object detection by radio wave. The output of the transmission/reception selector 140 is applied to an amplifier 150, and the output of the amplifier 150 is applied to a phase extractor 160. The output of the phase extractor 160 is applied to a processing unit 170, and the results of processing by the processing unit 170 are displayed on a display unit 180. An output signal from a position detector 190 detecting the position of the transmitter/receiver 120 is also applied to the processing unit 170. It will be seen from the above description that the apparatus according to the present invention differs from the prior art apparatus in that the phase extractor 160 and the processing unit 170 are additionally provided. Emphasis will be placed on such a feature of the present invention in the following description.

The transmission/reception selector 140 may be arranged to include two diodes such that the pulse signal generated from the pulse oscillator 130 is applied through one of the diodes to the transmitter/receiver 120, while the signal received from the transmitter/receiver 120 is applied through the other diode to an amplifier 150. Thus, radio wave is radiated from the transmitter/receiver 120 toward the medium 100, and, as a result, an echo or reflected wave returns toward the transmitter/receiver 120. This reflected wave is received by the transmitter/receiver 120 and converted into an electrical signal. This signal applied through the transmission/reception selector 140 to the amplifier 150 and then the phase extractor 160.

Figure 5:
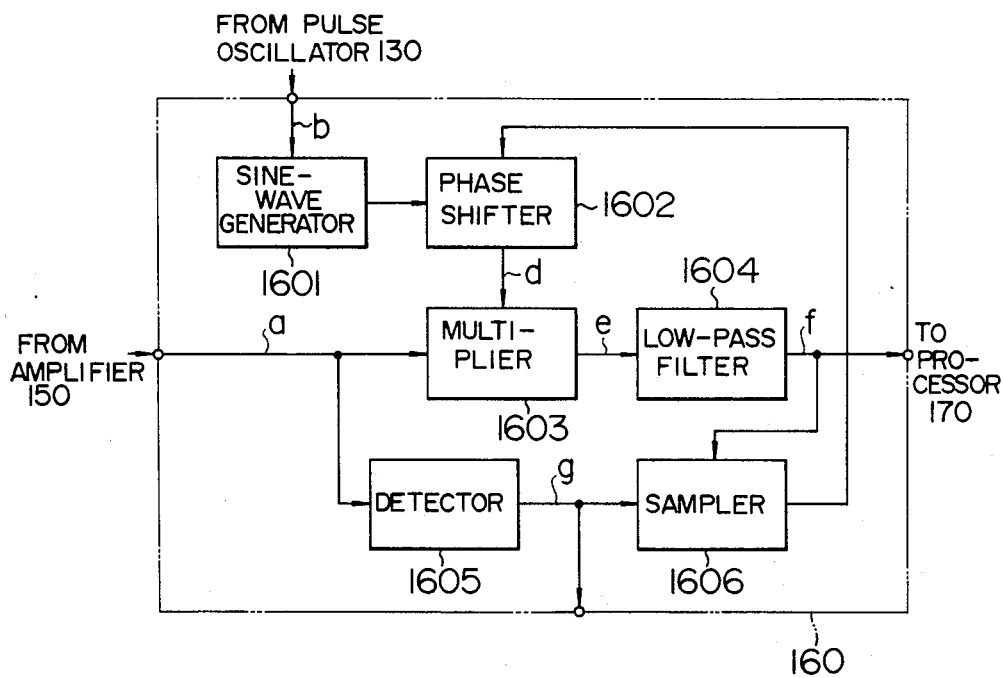
FIG. 5 is a block diagram showing in detail the structure of the phase extractor 160 shown in FIG. 1.

The detailed structure of the phase extractor 160 as well as the signal waveforms realizable at various parts of the phase extractor 160 will be described with reference to FIGS. 5 and 6 respectively.

Figure 6:
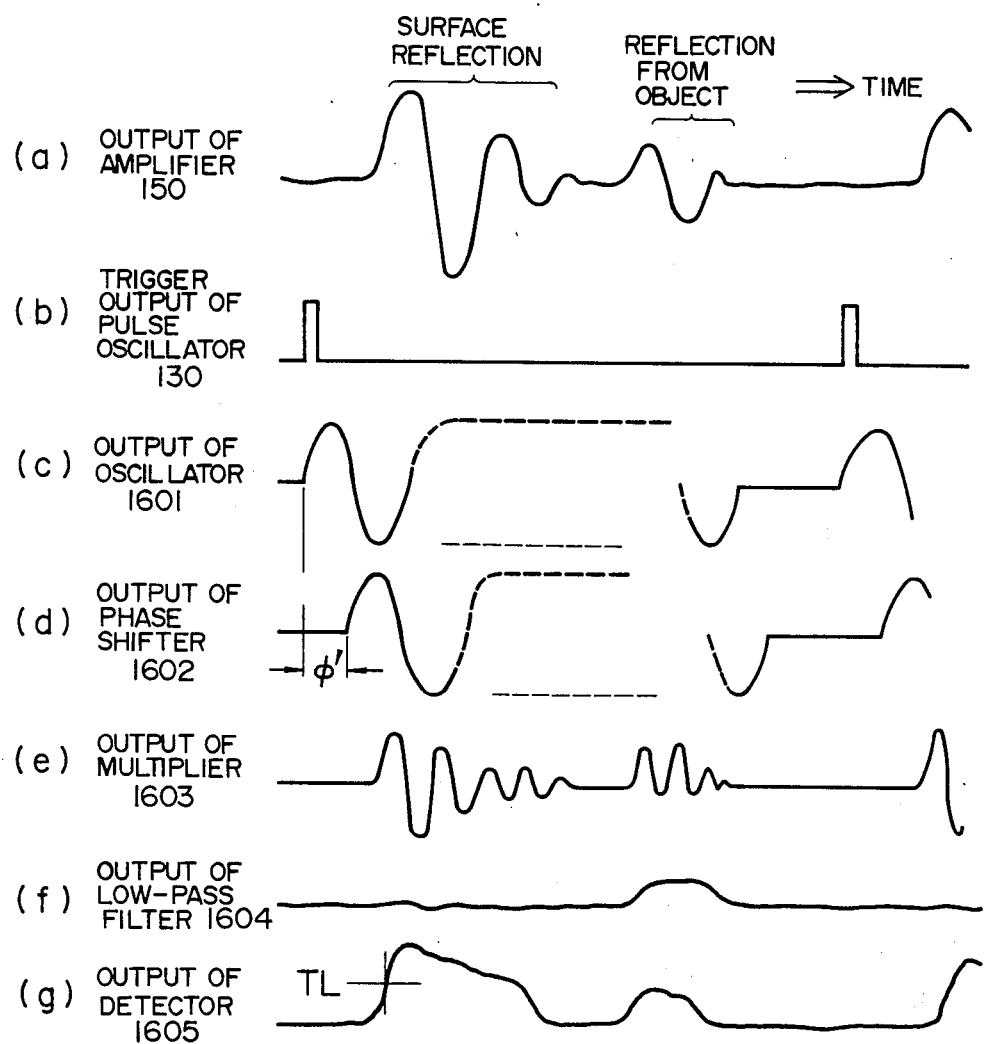
FIG. 6 shows waveforms appearing at various parts in FIG. 5.

The output of the amplifier 150 applied to the phase extractor 160 has a signal waveform which is a mixture of reflected wave from, for example, the ground surface and reflected wave from the object 110, as shown in FIG. 6. The phase extrator 160 operates in synchronism with the trigger output of the pulse oscillator 130. In response to the application of the trigger output of the pulse oscillator 130, a sine-wave oscillator or generator 1601 in FIG. 5 generates sine wave lasting for a pre-set period of time or having a pre-set wave number. Herein, the output of the sine-wave generator 1601 has an oscillation frequency which is the same as that of the pulse oscillator 130 applying its output to the transmitter/receiver 120 and an amplitude which is preferably the same as that of the reflected wave. A phase shifter 1602 acts to shift the phase of the oscillation output of the sine-wave generator 1601, and the amount of this phase shift is $\phi'$ as shown in FIG. 6. The output of the phase shifter 1602 and that of the amplifier 150 are multiplied by a multiplier 1603. As a result of multiplication, a component having a frequency two times as high as that of the operating frequency appears in the waveform of the output of the multiplier 1603. When such an output of the multiplier 1603 is passed through a low-pass filter 1604 permitting passage of a frequency equal to or lower than the operating frequency, an output having a waveform as shown in FIG. 6 appears from the low-pass filter 1604. The relation between the multiplication and the filtering will be arithmetically explained.

Now, the output of the amplifier 150 is expressed as follows:

$$V(t) = \sum_{n=1}^{N} A_n \sin(\omega t + \phi_n) \quad (4)$$

where,
 $A_n$; amplitude
 $\omega$; $2\pi f$
 f; operating frequency
 t; time
 $\phi_n$: phase corresponding to time delay until reflected signal is detected The meaning of the expression (4) is that N reflected waveforms appear with individual delay times after application of the trigger output of the pulse oscillator 130. The waveform of the output of the phase shifter 1602 is expressed as follows:

$$S(t) = \sin(\omega t + \phi') \quad (5)$$

Therefore, the product $V(t) \cdot S(t)$ is as follows:

$$V(t) \cdot S(t) = \tfrac{1}{2} \sum_{n=1}^{N} A_n[\cos(\phi_n - \phi') - \cos(2\omega t + \phi_n + \phi')] \quad (6)$$

Then, the output of the multiplier 1603 is passed through the low-pass filter 1604 having the filtering characteristic described above. As a result, the second term including the $2\omega$ component in the expression (6) can be removed, and the following expression (7) is obtained:

$$V(t) \cdot S(t) = \tfrac{1}{2} \sum_{n=1}^{N} A_n \cdot \cos(\phi_n - \phi') \quad (7)$$

If the phase $\phi'$ is controlled so that $(\phi_n - \phi')$ in the expression (7) is expressed as $$\phi_n - \phi' = \tfrac{\pi}{2} \times (2J - 1) \quad (8)$$

$$J = 1, 2, \ldots,$$

the component included in the n-th reflected waveform can be cancelled. This is because $\cos(\phi_n - \phi')$ becomes $$\cos(\phi_n - \phi') = 0 \quad (9)$$

in the expression (7) when the phase $\phi'$ is so determined as to establish the relation given by the expression (8).

By application of such a manner of phase control to the surface-reflected wave, the surface-reflected wave can be removed as shown in the output waveform of the low-pass filter 1604 in FIG. 6. A feedback loop composed of a detector 1605, a sampler 1606 and the phase shifter 1602 in FIG. 5 carries out the phase control described above. The detector 1605 acts to produce a signal substantially corresponding to an envelope of the output signal of the amplifier 150. The effect is the same when the detector 1605 detects the output of the multiplier 1603, instead of the output of the amplifier 150. The output waveform of the detector 1605 shown in FIG. 6 includes a portion corresponding to the surface-reflected wave. In the present invention, a threshold level TL is provided in the output of the detector 1605, as shown in FIG. 6, for the purpose of achieving the phase feedback control for removing the surface-reflected wave. When the output of the detector 1605 exceeds this threshold level TL, the sampler 1606 samples the output of the low-pass filter 1604. When this sampled value is zero, the instant value of phase shift by the phase shifter 1602 is unchanged. Since the amount of phase shift by the phase shifter 1602 depends on the level of the output of the sampler 1606, the feedback of the output of the sampler 1606 can necessarily determine the phase $\phi'$ in such a way as to satisfy the equation (8). Thus, the unnecessary surface reflection can be cancelled to extract the reflected signal from the object. The output of the low-pass filter 1604 is applied to the processing unit 170 which carries out necessary processing for the imaging of the object.

Figure 7:
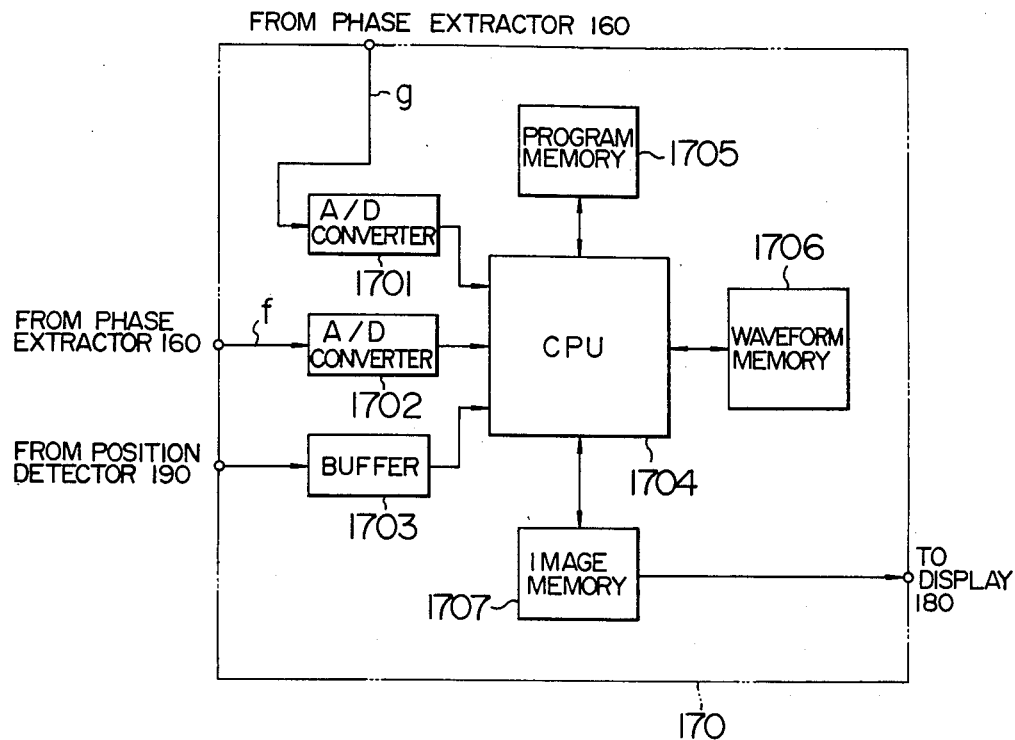
FIG. 7 is a block diagram showing the detailed structure of the processing unit 170 shown in FIG. 1.

The structure and function of the processing unit 170, which is another fundamental part of the apparatus of the present invention, will now be described in detail. The processing unit 170 includes, as its principal part, a microcomputer which operates according to program software. FIG. 7 shows the structure of the processing unit 170. Referring to FIG. 7, A/D converters 1701 and 1702 convert the output of the detector 1605 and the output of the low-pass filter 1604 into digital signals respectively. A digital-signal buffer element 1703 receives a digital signal which is provided by encoding the position information of the transmitter/receiver 120 by an encoder incorporated in the position detector 190. That is, the input to the A/D converter 1701 is the output of the detector 1605 which detects the reflected signal, the input to the A/D converter 1702 is the output of the low-pass filter 1604 which filters the product of the reflected signal and the sine wave signal, and the input to the buffer element 1703 is the position signal indicative of the position of the transmitter/receiver 120. The transmitter/receiver 120 may be moved along a linear path or moved two-dimensionally. However, the two-dimensional movement is regarded as two-dimensional scanning composed of a number of linear scans. Therefore, for simplification, the explanation will be made of a case where the transmitter/receiver 120 is moved along a linear path and hence the position information is given by a distance by which the transmitter/receiver 120 is moved from an original or reference point along a predetermined linear path. A CPU 1704 operates according to programs stored in a program memory 1705. A waveform memory 1706 stores temporarily the outputs of the A/D converters 1701 and 1702. The waveform data stored in the waveform memory 1706 are processed in the CPU 1704 according to the software, and the results of processing are transferred to an image memory 1707. The data transferred to and stored in the image memory 1707 are displayed as an image on the display unit 180.

The procedure of processing in the CPU 1704 for writing data into the image memory 1707 in the processing unit 170 will be described with reference to flow charts shown in FIGS. 8 and 9. The processing procedure is broadly classified into two parts. According to the first part, the waveform outputs of the A/D converters 1701 and 1702 are stored in the waveform memory 1706, and, according to the second part, the data stored in the waveform memory 1706 are arithmetically processed to be written in the image memory 1707. The former part of the processing procedure is shown in FIG. 8, and the latter part of the processing procedure is shown in FIG. 9.

Figure 8:
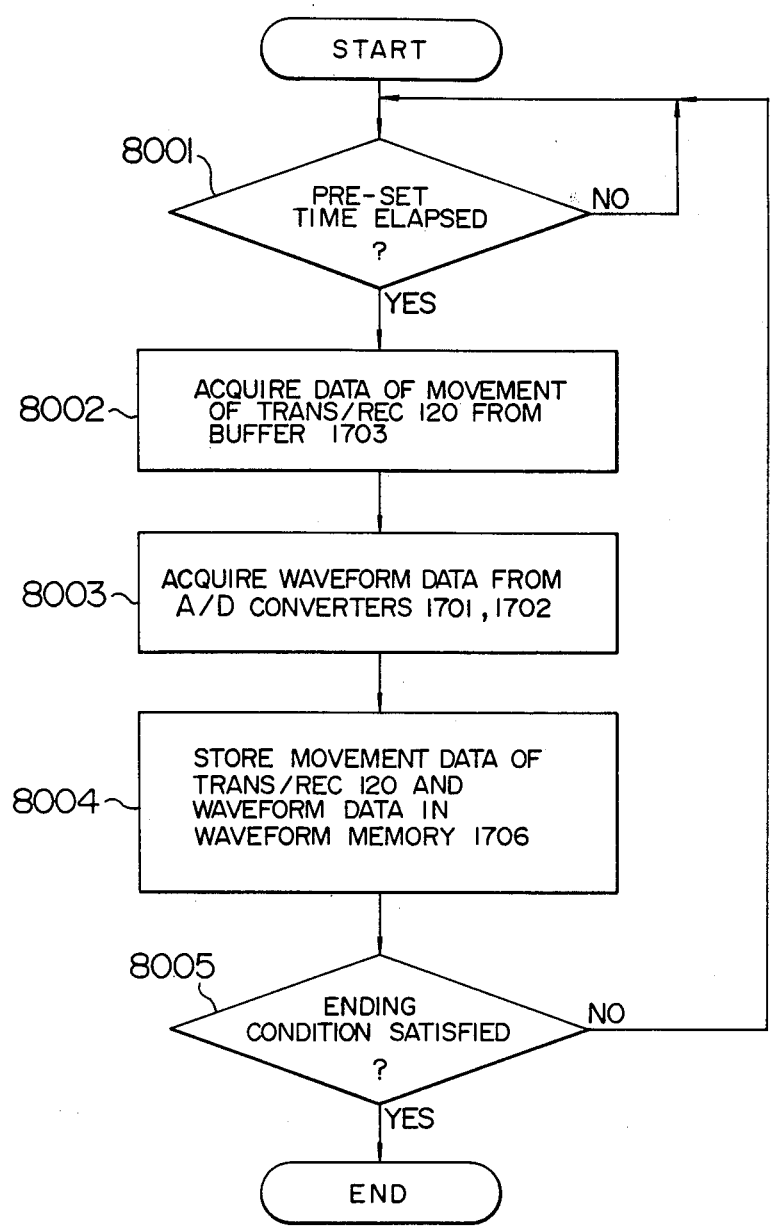
FIGS. 8 and 9 are flow charts showing the processing software of the processing unit 170.
Figure 9:
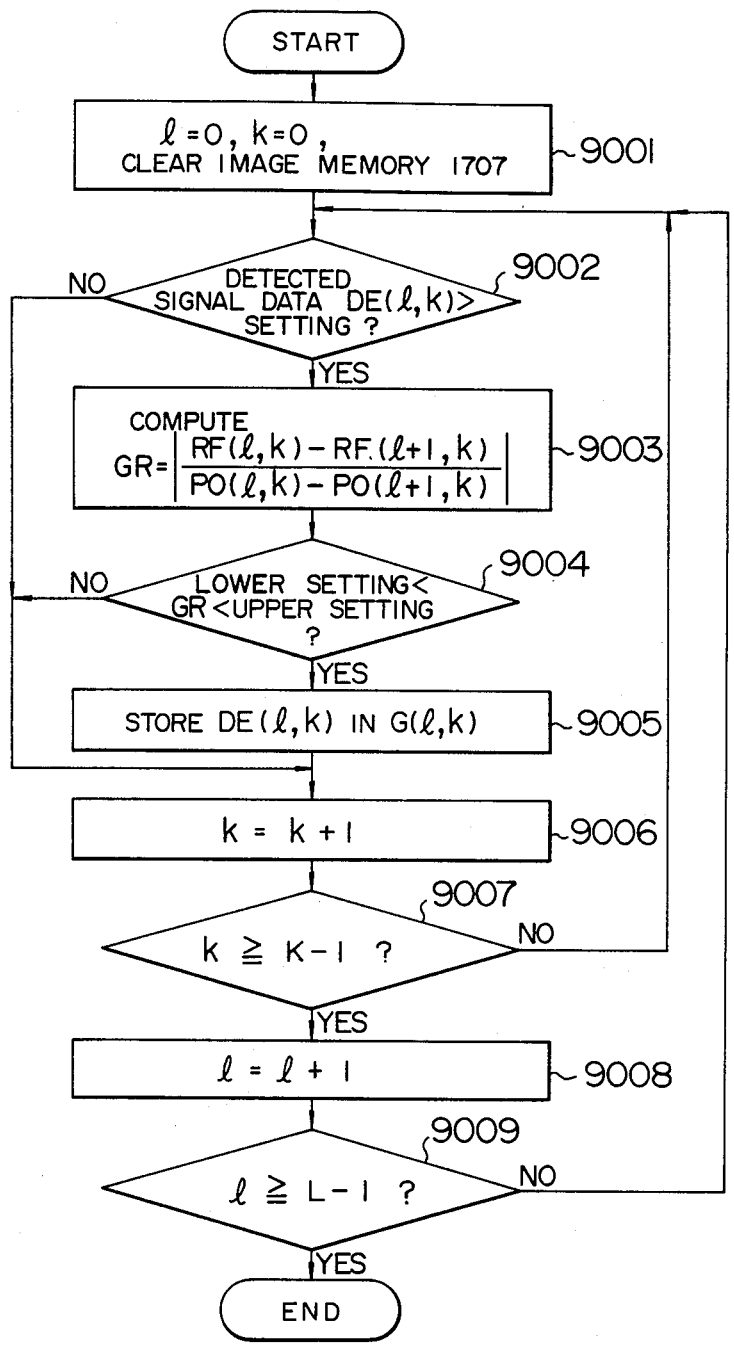

Referring to FIG. 8, when it is predetermined to start the acquisition of data at a pre-set period of time after starting of the program, first there is determined whether or not a pre-set period of time has elapsed after starting of the program in the step 8001. If it is predetermined to start the acquisition of data upon receiving a manual input signal (not shown) or when the transmitter/receiver 120 has moved a predetermined distance, the step 8001 will be changed so as to judge whether or not a manual input signal is received, or the transmitter/receiver 120 has moved a predetermined distance. When the result of judgment in the step 8001 is "YES", the data indicative of the amount of movement of the transmitter/receiver 120 is acquired from the buffer element 1703 in the step 8002. In the step 8003, the waveform data are acquired from the A/D converters 1701 and 1702. In the next step 8004, the data indicative of the amount of movement of the transmitter/receiver 120 and the waveform data are stored in the waveform memory 1706. The data acquisition processing is completed in the step 8005 when the required ending condition such that the required data acquisition period has lapsed or the required number of data acquisition cycles has completed is satisfied. In this stage, the waveform data at various positions of the transmitter/receiver 120, that is, the data indicative of the detected waveforms of the reflected signals and the data indicative of the waveforms of the phase-controlled reflected signals, are stored in the waveform memory 1706. These data are stored in the following memories:

Position data of transmitter/receiver 120; PO (l, k)
Data of detected signals; DE (l, k)
Data of reflected waves after phase control; RF (l, k)

The symbols PO, DE and RF designate two-dimensional memory units, respectively, each having (L+1)×(K+1) locations, and (l, k) indicate any one of the locations where an associated data is stored, wherein "l" takes any one of the values O to L corresponding to the position or the moved distance of the transmitter/receiver 120, thus L determines the number of data or waveforms to be acquired, while "k" takes any one of the values O to K which, corresponding to the k-th value when each waveform as acquired is sampled and A/D converted at (K+1) points, sequentially.

The procedure of processing the data PO (l, k), DE (l, k) and RF (l, k) stored in the waveform memory 1706 will be described with reference to the flow chart shown in FIG. 9. Starting of the program clears the image memory 1707 in the step 9001. This image memory 1707 is a K×L two-dimensional memory. Also, the values of l and k are initialized to l=0 and k=0 in this step 9001. In the step 9002, judgment is made as to whether or not the data DE (l, k), that is, the data indicative of the detected waveform of the reflected signal, exceeds a pre-set value. When the result of judgment in the step 9002 proves that the value of DE (l, k) exceeds the setting, this means that the phenomenon of a reflected wave is present. When the presence of a reflected wave is detected, the value of GR given by the following expression (10) is computed in the step 9003:

$$GR = \left| \frac{RF(l, k) - RF(l + 1, k)}{PO(l, k) - PO(l + 1, k)} \right| \tag{10}$$

The denominator in the expression (10) represents the amount indicative of the distance moved by the transmitter/receiver 120 from an l-th position to an (l+1)th position. The numerator in the equation (10) represents the amount indicative of how the output of the low-pass filter 1604 filtering the product of the reflected wave and the phase-controlled sine wave, that is, the output signal of the A/D converter 1702, changes from the l-th position to the (l+1)th position. In the step 9004, judgment is made as to whether or not the result of computation of the expression (10) lies between a lower setting and an upper setting. When the result of judgment in the step 9004 is "YES", the value of DE (l, k) is stored in the step 9005 in a memory G (l, k) of the image memory 1707 at an address corresponding to l and k at that time. On the other hand, when the result of judgment in the step 9002 proves that the value of DE (l, k) is less than the setting and also when the result of judgment in the step 9004 proves that the value of GR is more than the upper setting, no data is written in the image memory 1707, and k is incremented to k=k+1 in the step 9006. In the step 9007, whether or not k≧K−1 is judged, and, when the result of judgment proves that k=K−1, l is incremented to l=l+1 in the step 9008. In the step 9009, whether or not l≧L−1 is judged, and, when the result of judgment is "NO", the program is executed until the relation l=L−1 is attained. As a result of the above manner of processing, the data stored in the image memory 1707 include those data of DE each including the reflected wave signal therein and those values of GR each lying between its lower and upper settings.

How such a manner of processing is associated with imaging of the object will now be described. FIGS. 10A and 10B show the relation between the position of the transmitter/receiver 120 relative to the object 110 and the reflected waveform when the transmitter/receiver 120 is shifted in the lateral direction from the position directly above the object 110. Since the propagation velocity of radio wave in the medium 100 is generally constant, the timings of receiving the reflected waves from the object 110 at individual positions A, B and C of the transmitter/receiver 120 are proportional to the distances from the individual positions A, B and C to the object 110 respectively. Therefore, when the transmitter/receiver 120 is moved progressively in the order of the positions A, B and C, the reflected wave from the object 110 shifts rearward. The broken line in FIG. 10B illustrates the timing of detection of the object 110 in terms of the distance. The equation represented by the broken line provides a hyperbolic curve whose vertex is the object 110. Suppose that the depth of the object 110 is d, and the transmitter/receiver 120 is spaced apart by a distance x in the lateral direction from the apex of the object 110. Then, the apparent depth y at that position is given by the following expression:

$$y = \sqrt{d^2 + x^2} \quad (11)$$

Thus, the following hyperbolic curve is obtained:

$$(y/d)^2 - (x/d)^2 = 1 \quad (12)$$

The asymptotic line of the expression (9) is as follows:

$$y = \pm x \quad (13)$$

This asymptotic line is a straight line having an inclination of 45°. It will be seen from the equations (12) and (13) that the gradient of the hyperbola is zero at its vertex, that is, in the vicinity of the object 110 and is ±45° at the maximum. As described above, the reflected signal from the object 110 has such a characteristic that the gradient of the hyperbola is less than or equal to 45°. Therefore, when a suitable setting is previously provided for the gradient, and a value less than the setting is regarded to indicate a reflected wave from the object 110, the object 110 alone can be detected without being affected by noise. Also, since the change rate GR of surface reflection is nearly zero, the adverse effect of the surface reflection can be obviated by providing a suitable lower setting. The above manner of processing and judgment is made in the steps 9003 and 9004 in FIG. 9. Thus, in the present invention, the characteristic of the reflected signal from the object is uniquely grasped for the purpose of processing, and the resultant data are stored in the image memory 1707. The data stored in the image memory 1707 are displayed on the display unit 180 to reproduce a clear and sharp image free from noise and unnecessary surface-reflected wave.

Figure 11A:
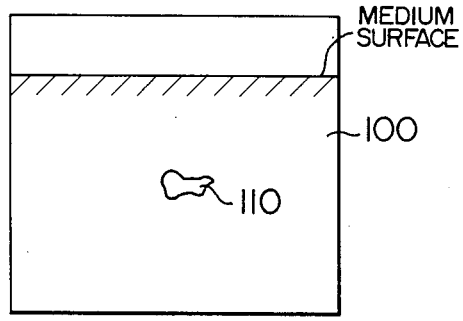
FIGS. 11A and 11B show the location of the object and the resultant image of the object.
Figure 11B:
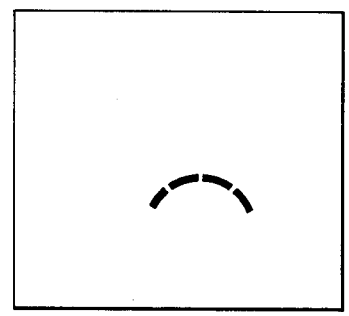

An example of such an image displayed on the display unit 180 will now be described. FIG. 11A illustrates an object 110 present in a medium 100, and FIG. 11B illustrates data stored in the image memory 1707 as a result of the aforementioned processing. The data are displayed in a 1:1 relation with the displayed image. As described already, the data stored in the image memory 1707 are information indicative of the intensity of the reflected waves. Therefore, when the data stored in the image memory 1707 are displayed after being subjected to intensity modulation, the portion where the reflective wave intensity is high is displayed bright, while the portion where the reflected wave intensity is low is displayed dark. Further, by virtue of the aforementioned effect of the change rate judgment, a clear and sharp image can be displayed without the possibility of displaying noise and surface-reflected wave except the wave reflected from the object.

Figure 12:
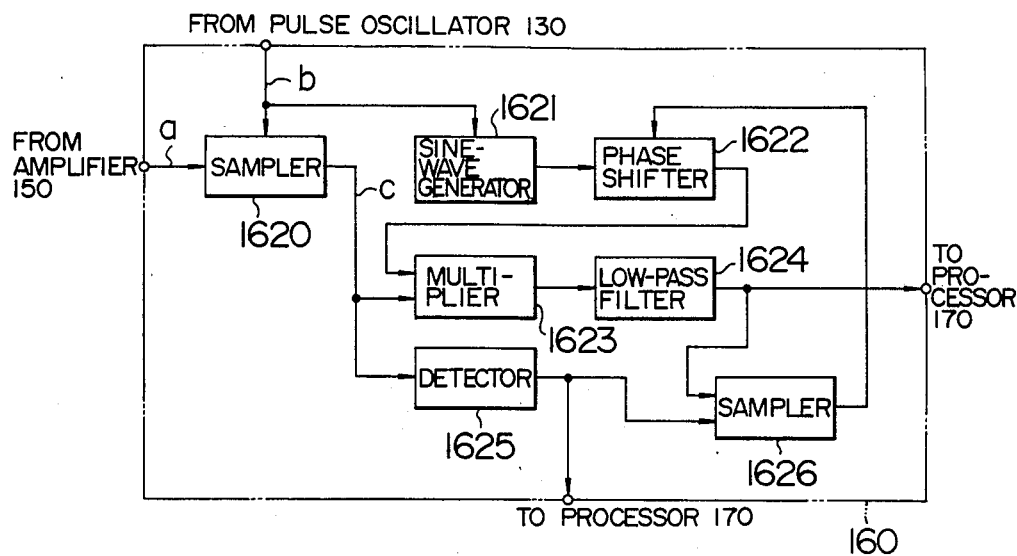
FIG. 12 is a block diagram showing in detail the structure of another form of the image extractor 160 preferably employed in the present invention.
Figure 13:
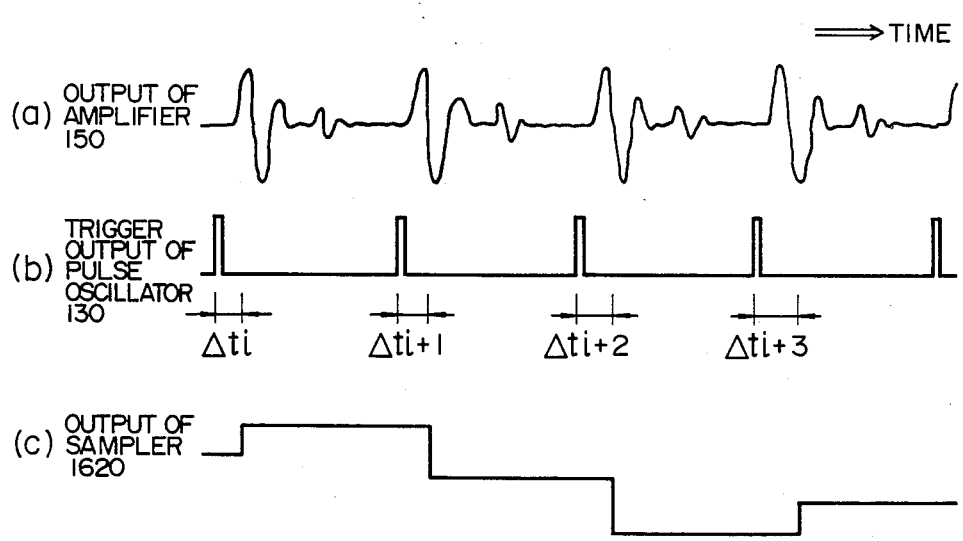
FIG. 13 shows waveforms appearing at various parts in FIG. 12.

Another form of the phase extractor 160 preferably employed in the present invention will be described. FIG. 12 shows the detailed structure of such a phase extractor 160. This phase extractor 160 is employed when an object buried in, for example, the earth is to be detected. In this case, the transmitter/receiver 120 radiates pulse-form electromagnetic wave, and the echo or reflected wave is detected by the transmitter/receiver 120. Since the operating frequency is very high in this case, it is difficult to directly subject the reflected wave signal to analog processing such as multiplying employed in the first embodiment. Therefore, a sampler 1620 is provided to sample the reflected wave signal, thereby lowering the frequency before processing. The function of the sampler 1620 will be described with reference to FIG. 13. In FIG. 13, the reflected signal waveform a appearing at the output b of the amplifier 150 is synchronous with the trigger output of the pulse oscillator 130. The sampler 1620 samples the output of the amplifier 150 at a time delayed relative to the timing of application of the trigger output of the pulse oscillator 130. This delay time is shown by $\Delta t_i$, $\Delta t_{i+1}$, $\Delta t_{i+2}$, . . . in FIG. 13. By so delaying the timing of sampling, the frequency of the output of the amplifier 150 can be lowered as shown in FIG. 13. In other words, although the output c of the sampler 1620 is analogous to the output waveform of the amplifier 150, its time base is extended. The sampler output having such a waveform is subjected to the processing described in the first embodiment. Describing in detail, in response to the application of the trigger output of the pulse oscillator 130, a sine-wave oscillator or generator 1621 generates sine wave lasting for a pre-set period of time or having a pre-set wave number. The oscillation frequency of the sine-wave generator 1621 is set at a value which is determined by the frequencies including the frequency radiated from the transmitter/receiver 120 and received by the transmitter/receiver 120 and the frequency of the trigger output of the pulse oscillator 130. A phase shifter 1622 acts to shift the phase of the oscillation output of the sine-wave generator 1621. The output of the phase shifter 1622 and that of the sampler 1620 are multiplied by a multiplier 1623. The phase extractor 160 further includes a low-pass filter 1624, a detector 1625 and a second sampler 1626. The amount of phase shift by the phase shifter 1622 is controlled on the basis of the result of sampling by the sampler 1626. The individual elements 1621 to 1626 shown in FIG. 12 operate in the same way as the individual elements 1601 to 1606 shown in FIG. 5 and generating the output waveforms shown in FIG. 6. Therefore, the operation of these elements 1621 to 1626 need not be described in detail. It will be seen that, in this second embodiment, the high frequency radiated from the transmitter/receiver 120 can be reduced by the sampler 1620 to a level which permits the phase feedback. The steps of processing in the processing unit 170 connected to the phase extractor 160 are the same as those executed in the first embodiment.

In a third embodiment of the present invention, the steps of processing in the processing unit 170 are partly modified. That is, in lieu of the computation executed in the step 9003 shown in FIG. 9, the following values are computed:

$$PR_0 = \cos^{-1}[RF(l, k)/DE(l, k)] \quad (14)$$

$$PR_1 = \cos^{-1}[RF(l+1, k)/DE(l+1, k)] \quad (15)$$

Then, on the basis of the results of computation of $PR_0$ and $PR_1$, the change rate GR is computed as follows:

$$GR = \left| \frac{PR_0 - PR_1}{PO(l, k) - PO(l+1, k)} \right| \quad (16)$$

The succeeding steps are the same as those described with reference to FIG. 9 in that judgment is made as to whether or not the computed value of GR lies within a pre-set range, and, when the result of judgment is "YES", data are processed for imaging of the object.

The physical meaning of the expressions (14), (15) and (16) will now be described. In the expressions (14) and (15), RF (l, k) represents the amount having the value given by the expression (7), and, thus, it represents the product of the amplitude $A_n$ of the reflected wave and the amount $\cos(\phi_n - \phi')$ relating to the phase. Also, in the expressions (14) and (15), DE (l, k) represents the amplitude of the detected signal, that is, the value of $A_n$ at certain values of l and k. Therefore, it is apparent that RF (l, k)/DE (l, k) is equivalent to $\cos(\phi_n - \phi')$ obtained by cancelling the amplitude $A_n$ in the expression (7). The value of $(\phi_n - \phi')$ is obtained by inverse cosine computation as shown in the expressions (14) and (15). In other words, $PR_0$ indicates the phase of the reflected wave signal itself at the position (l, k), and, similarly, $PR_1$ indicates the phase of the reflected wave signal itself at the position (l+1, k). Thus, $|PR_0 - PR_1|$ indicates the change in the phase when the transmitter/receiver 120 has moved over the distance corresponding to [P(l, k) − P(l+1, k)]. Therefore, GR indicates the phase difference when the transmitter/receiver 120 has moved over a unit distance. In other words, GR indicates the gradient of the line tangential to the hyperbola given by the expression (12), and the reflected signal from the object has such a characteristic that the gradient of the line tangential to the hyperbola lies within the range of 0° and 45°. Since the change rate of the surface-reflected wave is nearly zero, the surface-reflected wave can be removed when the setting of the gradient is suitably selected, but the reflected wave signal from the object can be imaged without being removed. As described above, the third embodiment is featured in that the phase information of the reflected wave is really noted for the imaging of the object.

Next, the technique of synthetic aperture processing of the imaging information derived from the phase extractor 160 and processing unit 170 will be described. For the purpose of explanation of the synthetic aperture processing, the properties of wave reflected from an object to be detected will be clarified first, and the mode of synthetic aperture processing based on the properties of the reflected wave will then be referred to. The information of the reflected wave is processed according to the software of the processing unit 170, and the results of processing are transferred to the image memory 1707 to be displayed on the display unit 180.

Figure 14:
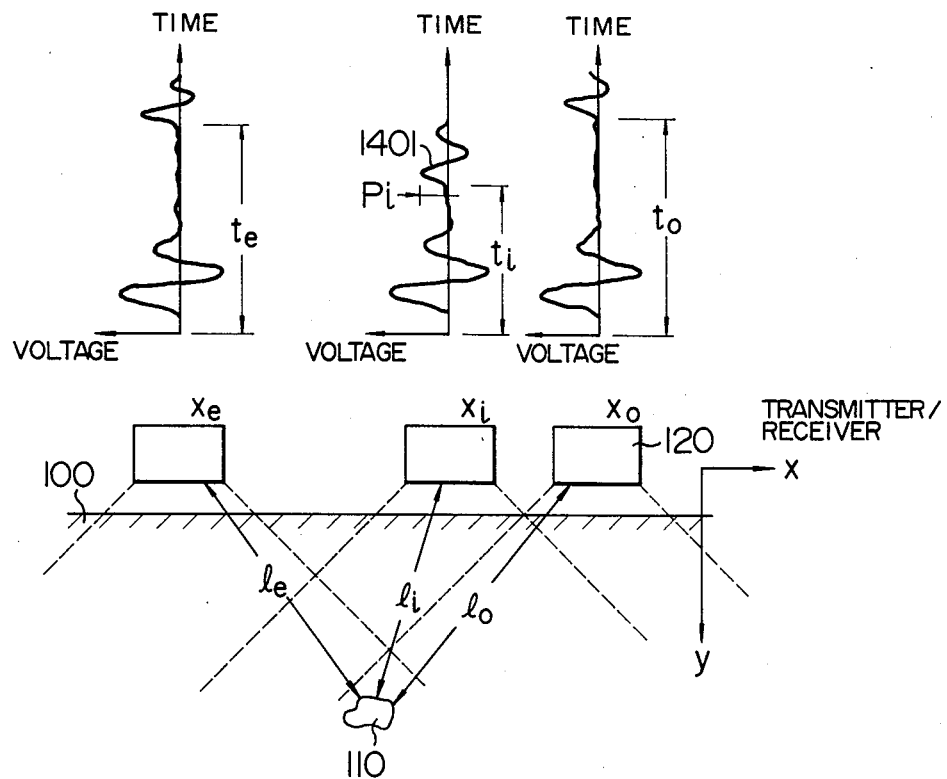
FIG. 14 shows different waveforms reflected from the object.

Suppose that an object 110 which is a reflector is buried in a medium 100 as shown in FIG. 14 is scanned by the transmitter/receiver 120. In such a case, waveforms as shown in FIG. 14 are reflected from the object 110 at individual scanning positions of the transmitter/receiver 120. Since the wave transmitted from the transmitter/receiver 120 propagates in a diverging fashion, the reflected wave from the buried object 110 can be received in a wide range of the scanning positions of the transmitter/receiver 120. The symbol i designates the distance between the antenna and the surface of the buried object 110 at a scanning position $x_i$. In FIG. 14, the waveform 1401 of the radio wave received at the scanning position $x_i$ is plotted as a voltage on the vertical axis, and the length of time elapsed from the time of transmission of the radio wave is plotted on the horizontal axis. In this case, the rise time $t_i$ of the reflected wave from the object 110 has the following relation between it and the distance $l_i$ between the object 110 and the transmitter/receiver 120:

$$t_i = 2l_i/C \tag{17}$$

where C is the propagation velocity of the wave.

It is supposed herein that the wave transmitted from the transmitter/receiver 120 does not diverge when the object 110 is imaged from the rise time $t_i$ of the reflected wave received by the transmitter/receiver 120. In other words, it is assumed that the wave transmitted from the transmitter/receiver 120 propagates in parallel to the y-axis. Under such an assumption, the coordinates ($x_i$, $y_i$) of the reflecting position of the object 110 are computed according to the following expression:

$$y_i = l_i = Ct_i/2 \tag{18}$$

Figure 15:
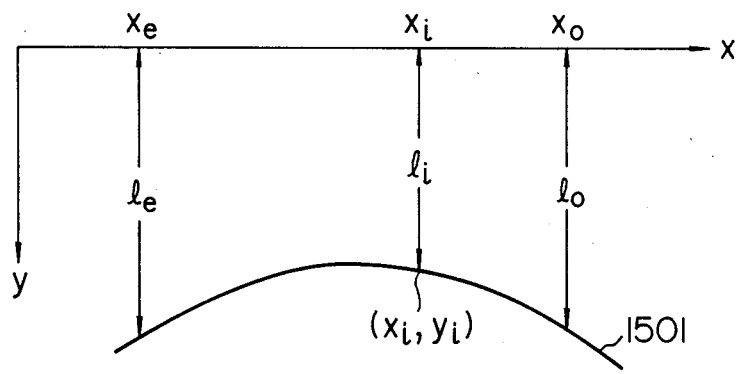
FIG. 15 shows the relation between the object and scanning positions for reproduction of the image of the object.

The computed values are then plotted to obtain an image 1501 of the object 110 as shown in FIG. 15.

However, the actual wave does not propagate in parallel to the y-axis but propagates in a diverging fashion. Therefore, the image 1501 obtained by plotting the reflection-point coordinates ($x_i$, $y_i$) computed by the equation (18) is expanded or magnified in both the x-direction and the y-direction compared with that obtained by plotting the coordinates of the true reflection points. That is, the profile of the image 1501 differs considerably from the actual surface profile of the object 110.

A method of displaying the image conforming to the actual shape of the object 110, while taking into account the divergent propagation of the radio wave, will be described with reference to a schematic diagram shown in FIG. 16.

First, an arc 1690 having the radius $l_i$ is drawn around the scanning position $x_i$ on the x-y plane. The arc 1690 has a length corresponding to the divergence of the radio wave transmitted from the transmitter/receiver 120 at the scanning position $x_i$. Detection of the rise time $t_i$ of the received wave means that the reflection position determined by the equation (18) is present on the arc 1690. Similarly, arcs are drawn for individual scanning positions $x_o$ to $x_e$ respectively. As a result, an image 1790 having a profile conforming to the actual surface profile of the object 110 can be drawn as shown in FIG. 17. However, according to this method, extra or unnecessary arc portions irrelevant to the surface profile of the object 110 are also drawn. That is, when the reflected wave is received at the scanning position $x_i$ at time $t_i$ after transmission of the wave, the reflection point of the reflector 110 is present on the arc 1690 having the radius $l_i(l_i = Ct_i/2)$ from the scanning position $x_i$ in FIG. 16. When, similarly, other arcs are drawn for the individual scanning positions $x_o$ to $x_e$, an image 1790 having a profile conforming to the actual surface profile of the object 110 can be depicted as shown in FIG. 17. However, when this method alone is resorted to, extra or unnecessary arc portions irrelevant to the surface profile of the object 110 are also drawn. A method of drawing for displaying a clear and sharp image will now be described.

Figure 18A:
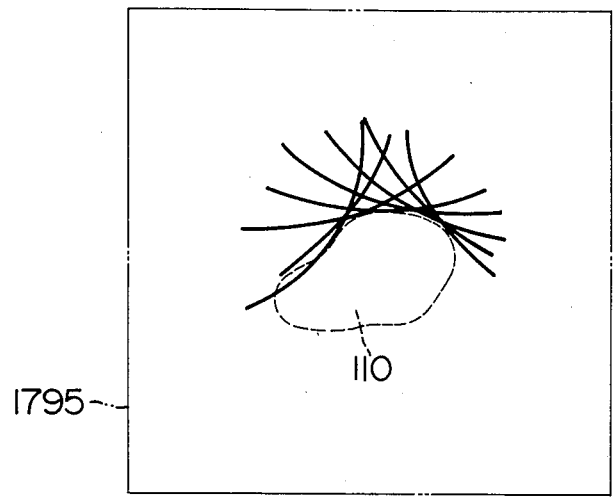
FIGS. 18A to 18D show how to enhance the accuracy of the image, together with the image finally reproduced.
Figure 18B:
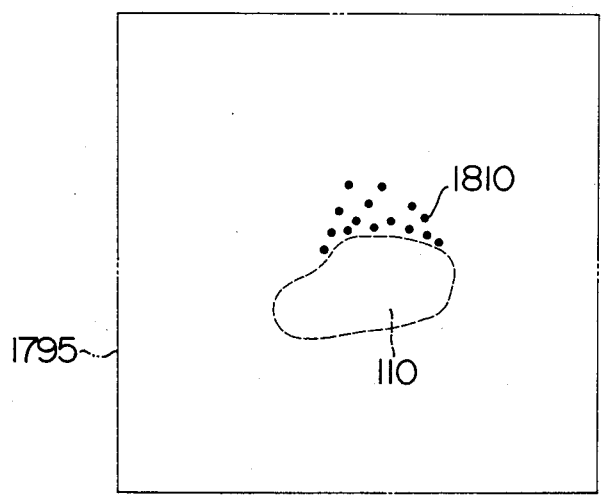
Figure 18C:
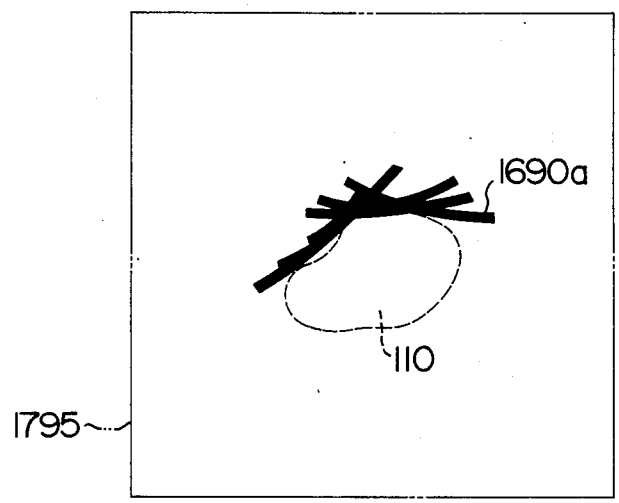
Figure 18D:
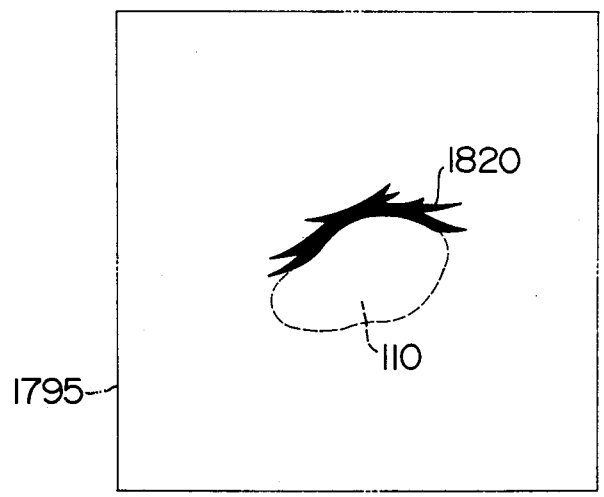

FIG. 18A is an enlarged view of the image enclosed in a frame 1795 shown in FIG. 17. It will be seen in FIG. 18A that, although the arcs 1690 are tangential to the surface of the object 110, the line width of the arcs 1690 is too small to clearly and sharply configure the surface profile of the object 110. The overlapping portions of the arcs 1690 are regarded to indicate the positions where the possibility of presence of the reflector 110 is high or maximum. Therefore, the overlapping positions only of the arcs 1690 in FIG. 18A are selectively extracted as displayed in FIG. 18B. In FIG. 18B, each of the points 1810 represents the position where the corresponding two arcs 1690 cross each other. The smaller the line width of the arcs 1690, a plurality of arcs 1690 overlap at less portions, and their cross points form an image which deviates in similarity from the actual surface shape of the object 110. Therefore, an attempt is made to increase the line width of the arcs 1690, for depicting the image. FIG. 18C shows such thickened arcs 1690a. In the confine of the frame 1795, the arcs 1690a overlapping more than the others are selectively extracted to form an image 1820 as shown in FIG. 18D. The illustrated image 1820 of the object 110 is formed by four or more arcs 1690a overlapping one another. When the line width of the arcs 1690a is increased, the overlappinig portions of the arcs 1690a are turned from the points into planes, and such an image cannot accurately reproduce the actual shape of the object 110.

A method capable of accurately reproducing the actual shape of the object 110 by overlapping portions of thickened lines of arcs will now be described.

When the propagation time $t_i$ of the wave is detected, an arc having the radius $l_i (l_i = Ct_i/2)$ is drawn around the scanning position $x_i$. This arc is considered herein as a wave front. Suppose that the propagation time $t_i$ includes a measurement error $\Delta t$. Then, in the radius range of from $l_i$ to $l_i + 2\Delta l$ ($\Delta l = C\Delta t/8$), an arc having an intensity "1" is drawn; in the radius range of from $l_i + 2\Delta l$ to $l_i + 4\Delta l$, an arc having an intensity "$-1$" is drawn; in the radius range of from $l_i$ to $l_i + \Delta l$ and in the radius range of from $l_i + 3\Delta l$ to $l_i + 4\Delta l$, arcs having an intensity "$1j$" (j: the symbol of imaginary number) are drawn; and in the radius range of from $l_i + \Delta l$ to $l_i + 3\Delta l$, an arc having an intensity "$-1j$" is drawn. That is, when the wave propagation time $t_i$ is detected, the reflector is present within the range of an angle $\theta$ at distances of $l_i$ to $l_i + 4\Delta l$ from the scanning position $x_i$. Representation of the classified arc intensities by the real number part and imaginary number part is equivalent to representation in terms of the probability distribution of the presence of the reflector in the specific region. A method of image display according to the above principle will now be described in detail.

Figure 19:
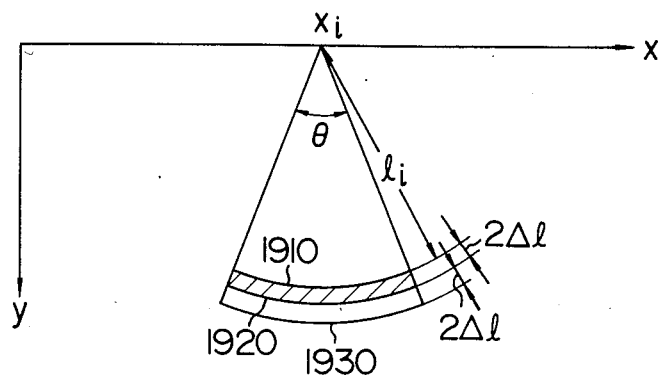
FIGS. 19 and 20 show in detail how to attain an accurate reproduction of the shape of the object.
Figure 20:
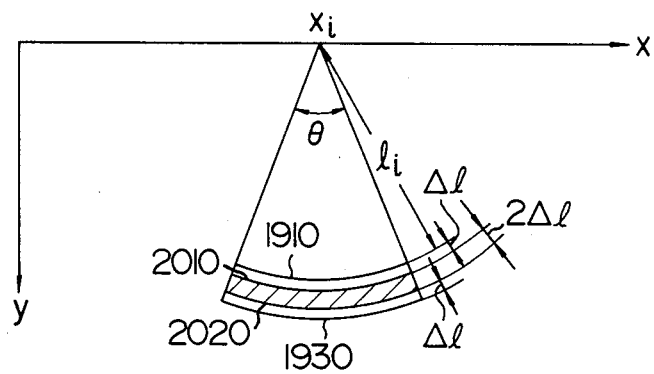

In FIG. 19, it is supposed that a display screen is provided by an x-y plane. Arcs 1910, 1920 and 1930 having respective radii $l_i$, $l_i + 2\Delta l$ and $l_i + 4\Delta l$ are drawn within the range of the angle $\theta$ around the scanning position $x_i$. It is supposed that the value of the picture elements existing in the hatched region defined between the arcs 1910 and 1920 corresponds to the maximum amplitude $P_i$ of the reflected wave shown in FIG. 14. It is also supposed that the value of the picture elements existing in the region defined between the arcs 1920 and 1930 is represented by $-P_i$. Similarly, arcs are drawn around the remaining scanning positions, and the values $P_i$ and $-P_i$ are added to the picture elements included in the corresponding regions defined between the arcs drawn around the individual scanning positions. In parallel to the procedure described above, the values $P_i$ and $-P_i$ are added to the values of picture elements included in regions defined between arcs shown in FIG. 20 which is the same as FIG. 19. More precisely, arcs 1910, 2010, 2020 and 1930 having respective radii $l_i$, $l_i + \Delta l$, $l_i + 3\Delta l$ and $l_i + 4\Delta l$ are drawn around the scanning position $x_i$ within the range of the angle $\theta$. The value $-P_i$ is added to the picture elements included in the regions defined between the arcs 1910 and 2010 and between the arcs 2020 and 1930. Similarly, the value $P_i$ is added to the picture elements included in the hatched region defined between the arcs 2010 and 2020. The same procedure is repeated for each of the individual scanning positions.

Upon completion of the value adding procedures, described above with reference to FIGS. 19 and 20, for all of the scanning positions, an integrated intensity $P_w (x, y)$ is computed for the values $P_5 (x, y)$ of the picture elements shown in FIG. 19 and for the values $P_6 (x, y)$ of the picture elements shown in FIG. 20, according to the following equation:

$$P_w (x, y) = P_5 (x, y) + P_6 (x, y)^2 \tag{19}$$

By displaying those picture elements only for which the value of $P_w (x, y)$ is larger than a predetermined reference value, an image 2100 reproducing the actual surface profile of the object 110 with high fidelity can be displayed as shown in FIG. 21. Thus, by computing the integrated intensity by the procedures shown in FIGS. 19 and 20 and according to the equation (19) described above, a clear and sharp image reproducing the exact shape of the object 110 with high fidelity can be displayed. It should be added that, in the procedures described with reference to FIGS. 19 and 20, values $+1$ and $-1$, instead of the values $P_i$ and $-P_i$ may be added to the corresponding picture elements respectively, so as to display a detailed image 2100 although the smoothness of the reproduction may be lost somewhat.

The technique of synthetic aperture processing has been described hereinabove. According to the described technique, a signal reflected from an object only can be detected and processed by any one of the first, second and third embodiments to display a clear and sharp image of the object. Therefore, the processing time can be greatly shortened compared with a prior art technique processing all of data on a screen.

It will be seen from the above description that, according to the present invention, a detected reflection signal from an object is multiplied by a reference signal whose frequency is the same as that of the echo signal. The phase of the reference signal can be controlled to cancel a specific reflection signal, so that an unnecessary signal such as a surface-reflected wave signal can be removed. Further, the change rate of the detected phase is computed to reproduce the image of the object only. Also, the reflection signal from the object only is subjected to the synthetic aperture processing so as to accurately detect the actual shape or size of the object. Therefore, unnecessary reflected waves and noise can be removed, and the image of the object only can be reproduced. Further, by virtue of the synthetic aperture processing of the reflected wave signal from the object, the image of the object can be reproduced with high accuracy within a short length of time. Thus, the object can be accurately detected at a high speed.

It will be understood from the foregoing detailed description of the present invention that unnecessary signals included in a received signal reflected from an object can be reliably removed to provide an accurate result of object detection.

We claim:

1. A method for detecting an object or a condition indicating a defect existing in a given medium comprising the steps of: transmitting a high frequency wave of radiation energy towards the medium where an object or said defect condition to be detected may exist; receiving at least a part of radiation energy reflected by both the surface of the medium and the object, if present, or the said condition present in the medium, if existing, and producing a first electrical signal corresponding to a waveform of the reflected radiation energy received producing a reference electrical signal based on a second electrical signal corresponding to said high frequency wave of the radiation energy and with its phase shifted by a controlled amount; multiplying said first electrical signal with said reference electrical signal so as to produce a third electrical signal; passing said third electrical signal through a lowpass filter, while controlling the amount of phase-shift of said reference signal, so that the output of the lowpass filter excludes those components of the third electrical signal which are derived from the radiation energy reflected by the surface of the medium; and processing the output signal of said lowpass filter to produce an information signal providing information of the presence of the object or a defect condition.

2. A method according to claim 1 wherein the step of controlling the amount of phase shifting of said reference signal further comprises sampling the magnitude of the signal at the output of the low-pass filter when said first electrical signal exceeds a predetermined level.

3. A method according to claim 2, wherein the step of processing the output signal of said lowpass filter comprises the steps of: storing, in a waveform memory, first data indicating displacement of a position where said high frequency wave of the radiation energy is transmitted towards the medium, second data relating to said first electrical signal which is variable according to the displacement of said position and third data indicating the output of said lowpass filter which is also variable according to the displacement of said position; detecting a variation of the output of said lowpass filter with displacement of said position based on the data stored in said waveform memory storing said third data in an image memory each time the variation of the output of said lowpass filter is within a predetermined range; and displaying the contents of said image memory.

4. A method according to claim 1, wherein the step of processing the output signal of said lowpass filter comprises the steps of: storing, in a waveform memory, first data indicating displacement of a position where said high frequency wave of the radiation energy is transmitted towards the medium, second data relating to said first electrical signal which is variable according to the displacement of said position and third data indicating the output of said lowpass filter which is also variable according to the displacement of said position; detecting a variation of the output of said lowpass filter with displacement of said position based on the data stored in said waveform memory; storing said third data in image memory each time the variable of the output of said lowpass fitler is within a predetermined range; and displaying the contents of said image memory.

5. An apparatus for detecting an object or a condition indicaiting a defect existing in a given medium comprising means for transmitting a high frequency wave of radiation energy towards said medium where are object or a condition indicating a defect to be detected may exist and receiving at least a part of the corresponding waveform of the radiation energy reflected by the surface of the medium and the object, if present, or the said condition, if existing, and means for producing a first electrical signal corresponding to a waveform of the reflected radiation energy received, means connected to receive a second electrical signal corresponding to the high frequency wave of the radiation energy for shifting the phase of said second signal by a controlled amount thereby producing a reference electrical signal, means for multiplying said first signal with said reference signal so as to produce a third electrical signal, a lowpass filter receiving said third signal and removing higher frequency components thereof so as to produce a fourth electrical signal, means for controlling the amount of phase shift produced by said phase-shifting means so that said fourth signal substantially excludes those components of said third signal which are derived from the radiation energy reflected by said medium, and means for processing said third signal to produce in information signal providing information of the presence of the object or a defect condition.

6. An apparatus according to claim 5, wherein said means for controlling the amount of phase-shifting by said phase-shifting means comprises sampling means, having an output, for sampling said fourth signal when said first electrical signal exceeds a predetermined level and for using this sampled output as a control for the phase shifting means.

7. An apparatus according to claim 6, wherein said sampling means output is operably coupled to the phase-shifting means as a feed back control signal to control the amount of phase-shifting.

8. An apparatus according to claim 5, wherein said phase shifting controlling means comprises: an envelope detector responsive to the reflected signal received for providing a threshold level at its output for removing the surface-reflective wave; a sampler for sampling the output of the lowpass filter in response to said threshold level having been reached and coupling the sampler output to said phase shifting means.

9. A method for detecting an object or a condition indicating a defect existing in a given medium comprising the steps of: transmitting a high frequency wave of radiation energy towards the medium where an object or said defect condition to be detected may exist, receiving at least a part of the radiation energy reflected by the surface of the medium, as well as the object if present, or the said condition present in the medium, if existing, and producing a first electrical signal corresponding to a waveform of the reflected radiation energy received, producing a reference electrical signal based on a second electrical signal corresponding to said high frequency wave of the radiation energy and with its phase shifted by a controlled amount, multiplying said first electrical signal with said reference electrical signal thereby producing a third electrical signal, passing said third electrical signal through a lowpass filter and, in response to the signal at an output of the lowpass filter, controlling the amount of phase-shift of said reference signal, so that the output of the lowpass filter excludes those components of the third electrical signal which are derived from the radiation energy reflected by the surface of the medium, and processing the output signal of said lowpass filter to produce an information signal providing information of the presence of the object or defect condition.

10. A method according to claim 9 wherein the step of controlling the amount of phase shifting of said reference signal further comprises sampling the magnitude of the signal at the output of the low-pass filter when said first electrical signal exceeds a predetermined level.

11. A method according to claim 10, wherein the step of processing the output signal of said lowpass filter comprises the steps of: storing, in a waveform memory, first data indicating displacement of a position where said high frequency wave of the radiation energy is transmitted towards the medium, second data relating to said first electrical signal which is variable according to the displacement of said position and third data indicating the output of said lowpass filter which is also variable according to the displacement of said position; detecting a variation of the output of said lowpass filter with displacement of said position based on the data stored in said waveform memory; storing said third data in an image memory each time the variation of the output of said lowpass fitler is within a predetermined range; and displaying the contents of said image memory.

12. A method according to claim 9, wherein the step of processing the output signal of said lowpass filter comprises the steps of: storing, in a waveform memory, first data indicating displacement of a position where said high frequency wave of the radiation energy is transmitted towards the medium, second data relating to said first electrical signal which is variable according to the displacement of said position and third data indicating the output of said lowpass filter which is also variable according to the displacement of said position; detecting a variation of the output of said lowpass filter with displacement of said position based on the data stored in said waveform memory storing said third data in an image memory each time the variation of the output of said lowpass filter is within a predetermined range; and displaying the contents of said image memory.

* * * * *